(12) United States Patent
Firoiu et al.

(10) Patent No.: US 6,820,128 B1
(45) Date of Patent: Nov. 16, 2004

(54) METHOD AND APPARATUS OF PROCESSING PACKETS HAVING VARYING PRIORITIES BY ADJUSTING THEIR DROP FUNCTIONS ACCORDING TO A PREDEFINED FAIRNESS RELATIONSHIP

(75) Inventors: Victor Firoiu, Bedford, MA (US); Yang Guo, Reading, MA (US); Xiaohui Zhang, Malden, MA (US)

(73) Assignee: Nortel Networks Limited (CA)

( * ) Notice: Subject to any disclaimer, the term of this patent is extended or adjusted under 35 U.S.C. 154(b) by 771 days.

(21) Appl. No.: 09/678,762

(22) Filed: Oct. 3, 2000

Related U.S. Application Data (60) Provisional application No. 60/163,551, filed on Nov. 4, 1999.

(51) Int. Cl.[7] ............................................... G06F 15/16
(52) U.S. Cl. ....................... 709/233; 709/232; 709/223; 709/225; 370/229; 370/230; 370/233
(58) Field of Search ................................. 709/200, 223, 709/225, 230, 232, 233; 370/230.1, 229, 230–233

(56) References Cited

U.S. PATENT DOCUMENTS

| | | | | |
|---|---|---|---|---|
| 5,121,383 A | * | 6/1992 | Golestani | 370/235 |
| 5,295,135 A | * | 3/1994 | Kammerl | 370/233 |
| 5,313,454 A | * | 5/1994 | Bustini et al. | 370/231 |
| 5,412,647 A | * | 5/1995 | Giroux et al. | 370/232 |
| 5,533,009 A | * | 7/1996 | Chen | 370/232 |
| 5,850,385 A | * | 12/1998 | Esaki | 370/395.21 |
| 5,978,356 A | * | 11/1999 | Elwalid et al. | 370/230 |
| 6,252,848 B1 | * | 6/2001 | Skirmont | 370/229 |
| 6,400,685 B1 | * | 6/2002 | Park | 370/232 |
| 6,680,906 B1 | * | 1/2004 | Nguyen | 370/229 |

OTHER PUBLICATIONS

Blake, et al., "An Architecture for Differentiated Services," IETF, RFC 2475, pp. 1–34, Dec. 1998.
Hurley, et al., "A Proposal for an Asymmetric Best–Effort Service," ICA, Ecole Polytechnique Federale de Lausanne (EPFL), Jun. 1999.
Firoiu, et al., "A Study of Active Queue Management for Congestion Control," IEEE INFOCOM 2000.
Almsberger, et al., "Differentiated Services on Linux," pp. 1–10, IETF Internet Draft, Jun. 1999.

* cited by examiner

*Primary Examiner*—Wen-Tai Lin
(74) *Attorney, Agent, or Firm*—Steubing McGuinness & Manaras LLP

(57) ABSTRACT

An apparatus and method of managing received packets to be transmitted from a network device stores the received packets on one of two different buffers. In particular, the received packets are one of a first type of data packet and a second type of packet. Each one of the first type is stored in a first buffer having a first drop function, while each one of the second type is stored in a second buffer having a second drop function. Each respective drop function specifies a packet drop rate as a function of the average number of packets in its respective buffer. The first drop function has a first average drop rate over a specified time interval, while the second drop function has a second average drop rate over the specified time interval. The first average drop rate and the second average drop rate have a predefined relationship. Accordingly, if the two drop rates do not comply with the predefined relationship, then at least one of the two average drop rates are modified.

58 Claims, 6 Drawing Sheets

METHOD AND APPARATUS OF PROCESSING PACKETS HAVING VARYING PRIORITIES BY ADJUSTING THEIR DROP FUNCTIONS ACCORDING TO A PREDEFINED FAIRNESS RELATIONSHIP

PRIORITY

This application claims priority from U.S. provisional patent application Ser. No. 60/163,551, filed Nov. 4, 1999, entitled, "BEST EFFORT DIFFERENTIATED SERVICES FOR TRANSMITTING DATA ACROSS A NETWORK," the disclosure of which is incorporated herein, in its entirety, by reference.

FIELD OF THE INVENTION

The invention generally relates to computer networks and, more particularly, the invention relates to processing various types of data in a network node for transmission in a manner specified for the various types of data.

BACKGROUND OF THE INVENTION

Data packets are utilized as a common transport medium for transmitting different types of data across the Internet. For example, data packets are used to transmit both audible data (e.g., Voice over IP) and data files (e.g., World Wide Web pages and word processing documents) over the Internet. Accordingly, a number of specialized data transmission protocols have been developed to transmit both types of data packets across the Internet. Among others, a widely used protocol for transmitting audible data is known in the art as the User Datagram Protocol ("UDP"), while a widely used protocol for transmitting files is known in the art as the Transport Control Protocol ("TCP").

There are instances when data packets with audible data should be transmitted with a minimal delay between a transmitter and a receiver. One such instance is when audible data in received packets are to be converted into an output audible signal upon receipt by the receiver (i.e., real time audio data). In such case, the data packets should be transmitted with a minimal delay to ensure that the output audible signal is intelligible to the human ear. As known in the art, an end-to-end delay of about 100 milliseconds or greater generally produces some noticeable degradation in the output audible signal. Such degradation can be merely annoying to a listener, or reduce signal quality to the point where it is unintelligible to a listener. Conversely, audible data can tolerate limited data packet loss since the human ear can compensate for some missing data within an audible signal. Various protocols for transmitting audible data (e.g., UDP) therefore permit a controlled packet loss during transmission in an effort to minimize end-to-end delay between the transmitter and the receiver.

In contrast to data packets with audible data, files transmitted in data packets generally can tolerate some transmission delay between the transmitter and the receiver. Such data types at the application layer level, however, generally cannot tolerate any loss of data packets since data loss can corrupt the entire data file being transmitted. For example, if the object code of an application program is being downloaded by a receiver, loss of just a small number of data packets can cause the entire application program to malfunction, when subsequently executing on the receiver (i.e., the program can crash on the receiver). Conversely, if such application program was downloaded in fifteen minutes on a conventional 56 kilobytes per second modem, then a slight delay of an additional few seconds should not be noticeable to the user. Network designers therefore have developed various data transport protocols, such as TCP, that intentionally permit some additional packet retransmission delay in an effort to eliminate the packet drop rate.

It should be noted that applications (i.e., the application layer) generally are not tolerant to data loss. Applications nevertheless are tolerant to a small data loss at the network layer since retransmission is received at the transmission layer (i.e., at TCP).

A single network device transmitting both of the above noted types of data packets undesirably commonly improves performance of one type of data at the expense of the other type of data. For example, a network device can ensure that all received packets with audible data are transmitted immediately upon receipt. During burst transmissions of both types of data, data packets with files consequently can be dropped to ensure that the data packets with audible data are transmitted. Dropping data packets with files, however, causes the problems noted above. To obtain entire data files, such data must be re-transmitted, further causing congestion problems in the network.

Moreover, single network devices transmitting both types of data (e.g., via TCP and UDP, respectively) can also have the additional problem of requiring relatively large delay for congestion control. Specifically, TCP requires that a relatively large average queue size be maintained. Undesirably, however, such a large queue can produce an unnecessary delay on packets with audible data.

SUMMARY OF THE INVENTION

In accordance with one aspect of the invention, an apparatus and method of managing received packets to be transmitted from a network device stores the received packets on one of two different buffers. In particular, the received packets are one of a first type of data packet and a second type of packet. Each one of the first type is stored in a first buffer having a first drop function, while each one of the second type is stored in a second buffer having a second drop function. Each respective drop function specifies a packet drop rate as a function of the average number of packets in its respective buffer. The first drop function has a first average drop rate over a specified time interval, while the second drop function has a second average drop rate over the specified time interval. The first average drop rate and the second average drop rate have a predefined relationship. Accordingly, if the two drop rates do not comply with the predefined relationship, then at least one of the two average drop rates are modified.

In illustrative embodiments, the first buffer and second buffer each have respective first and second packet withdrawal rates that specify the rate that the packets are withdrawn from the respective buffers. In such case, the two average drop rates may be modified by changing at least one of the first packet withdrawal rate and the second packet withdrawal rate. In other instances, the average drop rates may be modified by modifying the second average drop rate as a function of the average number of packets stored in the first buffer.

The first and second drop functions each may have respective start and end points. The start and end points of the first drop function are respectively referred to herein as the first start point and the first end point, while the start and end points of the second drop function are respectively referred to herein as the second start point and the second end point. In such case, the predefined relationship may specify that the first average drop rate is at the first start point whenever the second average drop rate is at the second start point. In a similar manner, the predefined relationship may specify that the first average drop rate is at the first end point whenever the second average drop rate is at the second end point.

In other embodiments, the first drop function defines a first curve connecting the first start point with the first end point, while the second drop function defines a second curve connecting the second start point and the second end point. The predefined relationship in such case may specify that the first average drop rate moves along the first curve at a first rate, while the second average drop rate moves along the second curve at a second rate. The first and second rates may be constant. In some embodiments, the first and second rates are different.

The first and second packet types may be any type of packet known in the art. For example, the first packets may be loss sensitive packets (i.e., packets that generally tolerate packet delay better than data loss), while the second packets may be delay sensitive packets (i.e., packets that generally tolerate data loss better than packet delay).

In accordance with another aspect of the invention, an apparatus and method of processing a received packet for transmission across a network first determines the type of the packet. The packet can be one of two types, such as a delay sensitive packet or a loss sensitive packet. The packet is added to a loss sensitive buffer if the packet is determined to be a loss sensitive packet. Conversely, the packet is added to a delay sensitive buffer if it is determined to be a delay sensitive packet. The loss sensitive buffer has a loss sensitive packet drop function relating to dropping packets in the loss sensitive buffer, while the delay sensitive buffer has a delay sensitive packet drop function relating to dropping packets in the delay sensitive buffer. The two buffers are operatively coupled with an output for forwarding packets to the network. The loss sensitive packet drop function and the delay sensitive packet drop function preferably are different.

In some embodiments, each packet drop function produces a packet drop rate as a function of the average number of packets in its buffers. In other embodiments, the packet is forwarded from one of the two buffers to the output for transmission to the network. The packet may have a header with data identifying the type. The type thus may be determined by parsing the header. The two buffers each may have an associated weight variable for transmitting the packet to the network. The weight variable of each buffer may have an associated fairness quality.

Preferred embodiments of the invention are implemented as a computer program product having a computer usable medium with computer readable program code thereon. The computer readable code may be read and utilized by the computer system in accordance with conventional processes.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

Figure 1:
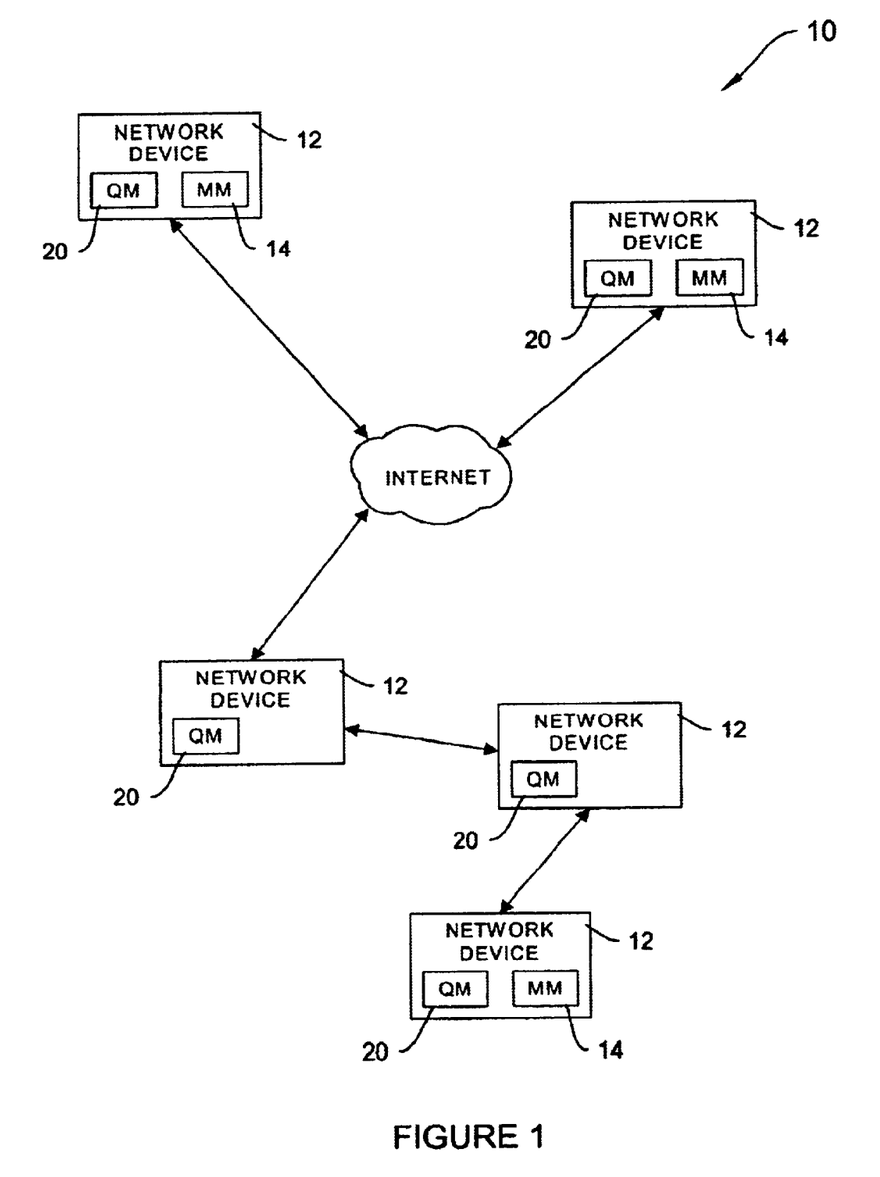
FIG. 1 schematically shows a preferred network arrangement that may be utilized to implement preferred embodiments of the invention.

FIG. 1 schematically shows an exemplary network arrangement ("network 10") that may be utilized to fairly transmit data packets in accord with illustrative embodiments of the invention. The data packets may be used to transport any type of data commonly transported across a network 10, such as file data (e.g., World Wide Web documents) or real time audio data (e.g., Voice over IP and streaming media data). It should be noted that although illustrative embodiments discuss data packets carrying file data or real time audio data, various embodiments are applicable to data packets carrying other types of data. In a similar manner, although data packets are discussed, all embodiments may be applicable to other data transmission constructs that transport data across a network.

Among other things, the network 10 includes a plurality of network devices 12 that are in communication with a public network (e.g., the Internet). Of course, the network devices 12 may be in communication with any public, private or combination network. Each of the network devices 12 may be any type of network node that transmits and/or receives data packets, such as a server, a computer system, a switch, a multiplexer, or a router. Accordingly, each of the network devices 12 shown in FIG. 1 may be a part of another network, such as a local area network. Moreover, each network device 12 may include one or more client computers (not shown) that also transmit and/or receive data packets.

In illustrative embodiments, the data packets are transmitted across the network 10 in accord with the well known Internet Protocol ("IP"), which is a network layer protocol. When transporting file data, the data packets preferably are transported in accord with the well known Transport Control Protocol ("TCP"), which is a transport layer protocol. As known by those in the art, the combination of IP and TCP often is referred to as "TCP/IP." When transporting real time audio data, the data packets preferably are transported in accord with the well known User Datagram Protocol ("UDP"). Although discussed in terms of these protocols, however, various embodiments of the invention may utilize other data transmission protocols. For example, the X.25 protocol may be used, or different variants of TCP, IP, and UDP may be used.

In a similar manner, although file data and real time audio data are discussed, other types of data may be utilized, such as video data, streaming media, and facsimile data. File data and real time audio data nevertheless are discussed as exemplifying data types having various data transmission qualities. Specifically, file data generally has the transmission quality of tolerating some transmission delay and yet, generally not tolerating any data loss. Data having this quality is referred to herein as "loss sensitive" data. Conversely, real time audio data generally has the quality of tolerating some data loss but generally not tolerating much delay. Data having this quality is referred to herein as "delay sensitive" data. These complimentary qualities (also referred to in the art as "parameters") are discussed herein with reference to illustrative embodiments.

Other embodiments can address other transmission qualities, such as delay-jitter, which permits some delay for all packets of a single transmission. An example of a type of data that has a delay-jitter quality is an audio or video application that is downloaded and played back by an audio or video player on a computer system. The output playback typically occurs within about one to three seconds after receipt of the packets. Such systems often buffer this one to three seconds of data in a jitter buffer.

As known in the art, each data packet transmitted in accordance with the Internet Protocol has a header with control information relating to the data packet. Among other information, the header may include data identifying the destination of the packet and the origin of the packet. In illustrative embodiments, the header also includes a type field for identifying the type of data being transmitted. Accordingly, prior to transmitting a data packet that it generated, a network device 12 preferably enters the type of data carried by the data packet in the type field of the header. Such field may be a two bit field that can indicate real time audio data if it has a "01" value, and file data if it has a "10" value. In other embodiments, instead of or in addition to identifying the type of data, the header includes a field for identifying the network transmission quality of the data in the data packet.

Network devices 12 with this capability of modifying the header thus preferably have a marking module 14 for writing, in the header, the data type of the data carried by the data packet. In illustrative embodiments, only edge network devices 12 have a marking module 14. The marking module 14 may be either a hardware element, a software element, or a combination of hardware and software. In some embodiments, the marking module 14 is implemented within a software application generating the data to be transmitted in the data packets. For example, such software application may be an Internet Telephone application program (executing on a network device 12) that generates voice data for transmission across the Internet.

Figure 2:
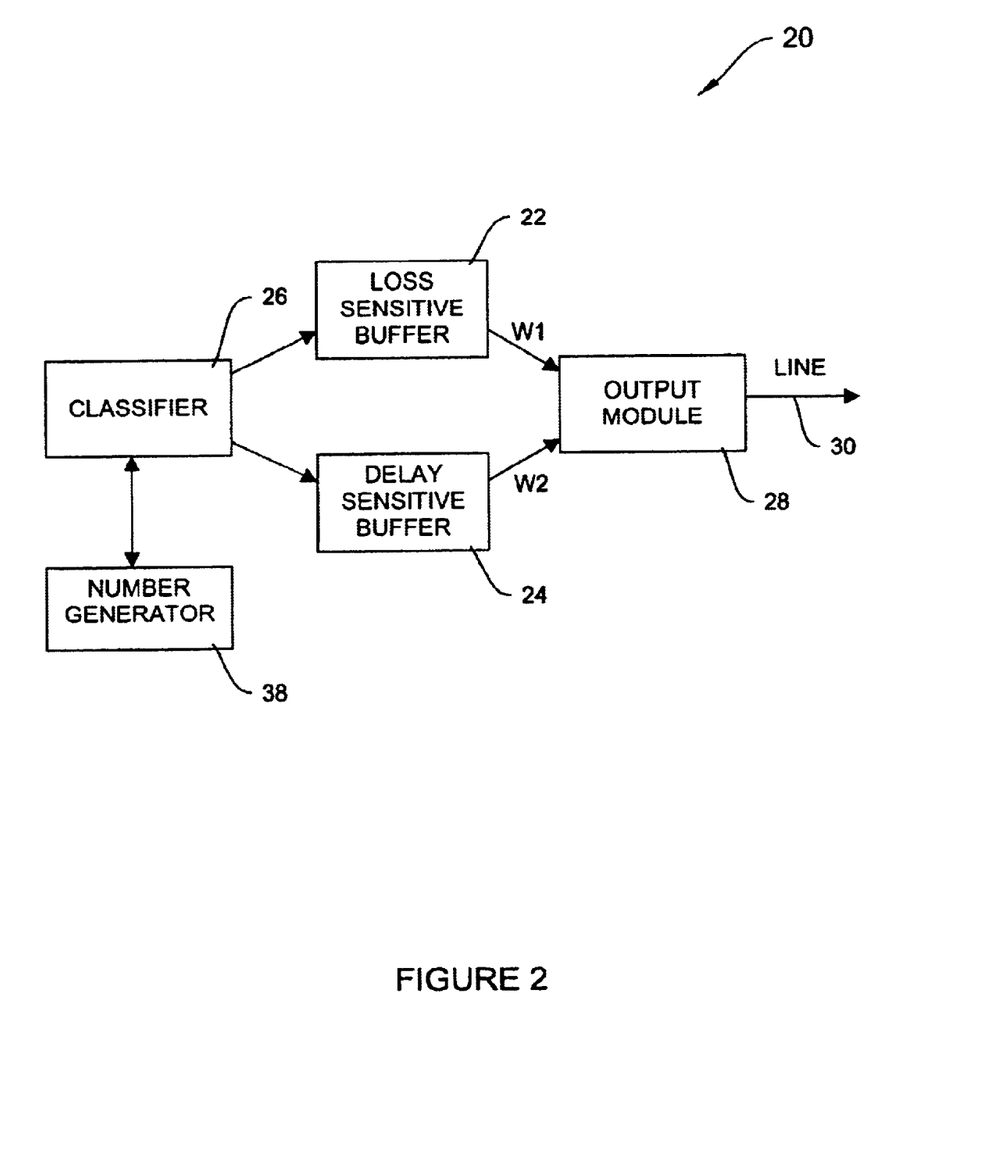
FIG. 2 schematically shows a queue manager that may implement illustrative embodiments of the invention.

FIG. 2 schematically shows some details of a queue management module (within any one of the network devices 12 of FIG. 1) that processes data packets for transmission to the network 10. The queue management module ("management module 20") includes a loss sensitive buffer 22 for buffering loss sensitive data packets, a delay sensitive buffer 24 for buffering delay sensitive data packets, and a classifier 26 for receiving data packets and responsively directing such received data packets to the appropriate buffer 22 or 24 (see FIGS. 4 and 6). Queues of data packets may be formed in the two buffers 22 and 24 for transmission across the network 10. In preferred embodiments, the buffers 22 and 24 are first-in, first-out buffers (known in the art as "FIFO buffers").

In addition, the management module 20 also includes an output module 28 that retrieves data packets from the buffers 22 and 24 for transmission to the network 10 through an output line 30 (e.g., a T1 line), and a random number generator 38 (discussed below). Details of the processes executed by the management module 20 are discussed below with reference to FIGS. 4–7.

Data packets generally are not buffered in the buffers 22 and 24 unless the total number of data packets received by the network device 12 exceeds the total number of data packets that can be transmitted across the output line. This commonly can occur during burst transmissions, or during conventional heavy usage times. In such case, the buffers 22 and 24 are used to temporarily store data packets until they can be transmitted. In illustrative embodiments, the buffers 22 and 24 each operate in accordance with a predefined packet drop function ("drop function"). The drop function for a given buffer 22 or 24 controls the size of the such buffer 22 or 24 by efficiently dropping selected numbers of data packets before they can be buffered in such buffer 22 or 24. More particularly, the drop functions are utilized by the processes shown in FIGS. 4 and 6 (discussed in detail below) to determine whether packets are to be dropped, or added to one of the buffers 22 and 24 for transmission across the network 10.

Figure 3A:
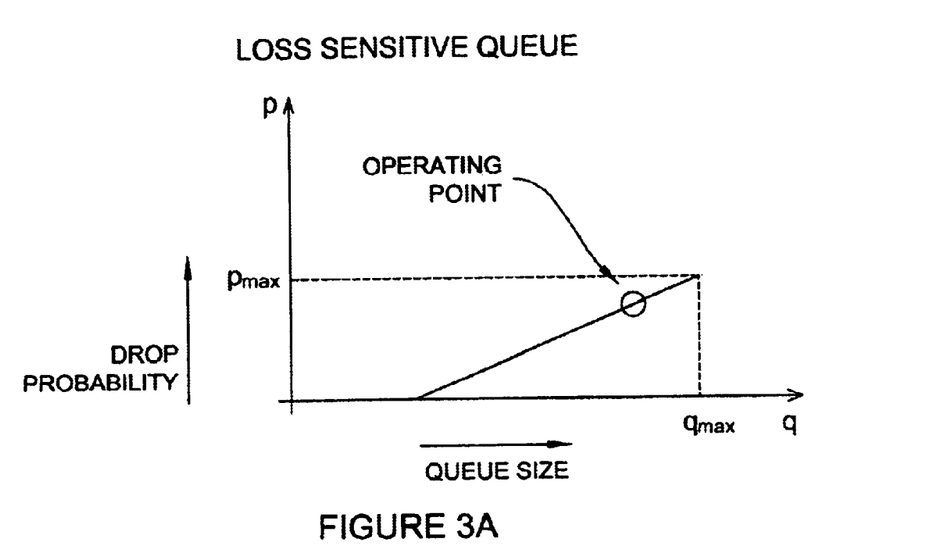
FIG. 3A graphically shows an exemplary drop probability function for a loss sensitive buffer shown in FIG. 2.
Figure 3B:
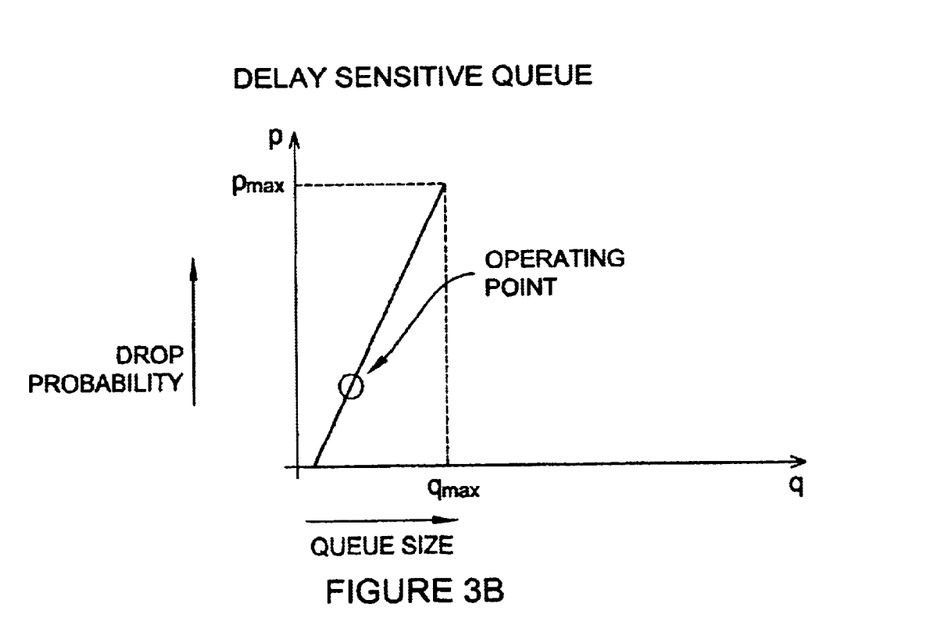
FIG. 3B graphically shows an exemplary drop probability function for a delay sensitive buffer shown in FIG. 2.

FIGS. 3A and 3B show exemplary drop functions that are associated with the buffers 22 and 24 shown in FIG. 2. Specifically, FIG. 3A shows an exemplary drop function associated with the loss sensitive buffer 22, while FIG. 3B shows an exemplary drop function associated with the delay sensitive buffer 24. In preferred embodiments, the drop functions are generated to comply with well known Random Early Detection ("RED") processes. In particular, FIGS. 3A and 3B show the probability that packets will be dropped from the loss sensitive buffer 22 and the delay sensitive buffer 24, respectively, as a function of their respective queue size (i.e., the total or average number of packets stored in each respective buffers 22 and 24). The drop functions are used, in preferred embodiments, to intentionally drop data packets instead of adding them to their appropriate buffers 22 or 24 (discussed below).

As can be deduced by inspection, each drop function has a zero drop probability for a queue size ranging in size from zero to a minimum value. As the queue size increases from the minimum value, the drop probability rises linearly to a maximum drop probability at a maximum queue size. Such maximum drop probability (and drop functions, as shown in FIG. 3) preferably is different for the two buffers 22 and 24. For example, the maximum drop probability for the loss sensitive buffer 22 may be about 0.01, while maximum drop probability for the delay sensitive buffer 24 may be about 0.05. In either buffer 22 or 24, if the queue size is greater than the maximum queue size, then the drop probability increases at a much faster rate to a final drop probability of 1.0. As also can be deduced by inspection, the slope of the drop function for the delay sensitive buffer 24 (FIG. 3B) preferably is much greater than the slope of the loss sensitive buffer 22 (FIG. 3A). This relationship favors not dropping loss sensitive packets. Moreover, although curves representing linear functions are shown, other curves may be utilized to implement the drop functions. For example, nonlinear curves may be utilized.

Each drop function preferably has an "operating point," which is an average drop probability over a predefined time interval (e.g., one to two seconds). In preferred embodiments, the operating point of each of the two drop functions shown are set to comply with a predefined relationship. For example, in one relationship, both operating points will move along their curves at constant rates to arrive at their respective maximum queue sizes at substantially the same time. In another exemplary relationship, one operating point may lag the other operating point. In still another exemplary relationship, one operating point may move a set amount faster along its curve than the other operating point moves along its curve. Accordingly, if these operating points are determined to not comply with the predefined relationship, then they are adjusted, as necessary.

These relationships are set, in accordance with preferred embodiments, to ensure that bandwidth that may be utilized by each buffer 22 and 24 is "fairly" allocated. Accordingly, to ensure fairness in preferred embodiments, the relationships are set so that the operating points favor forwarding the packets in the delay sensitive buffer 24 with a smaller queue waiting time than those in the loss sensitive buffer 22. Complementarity, the relationships also are set to favor dropping packets in the delay sensitive buffer 24 more readily than those in the loss sensitive buffer 22. These set relationships should provide, on average, improved application level performance over systems that do not implement such relationships. It should be noted, however, that although these relationships should improve average performance, there may be instances when these relationships may not improve some of the application layer performance. Nevertheless, the improvements gained are expected to offset the fewer times when performance is not improved. Details of the process of fairly allocating bandwidth are discussed in greater detail below with reference to FIGS. 4–7.

It should be noted that the RED functions are exemplary and thus, not intended to limit various embodiments of the invention. For example, instead of showing drop rate probabilities as a function of queue size, the RED functions can be generally considered to show drop rates as a function of queue size. The operating point of a RED function thus can be considered to show an average drop rate for an average queue size. As discussed below, the RED functions shown in FIGS. 3A and 3B are utilized with a larger process for determining the actual drop rate of the buffers 22 and 24. Accordingly, other types of drop functions that directly specify actual packet drop rates as a function of queue size can be used with various embodiments of the invention.

Figure 4:
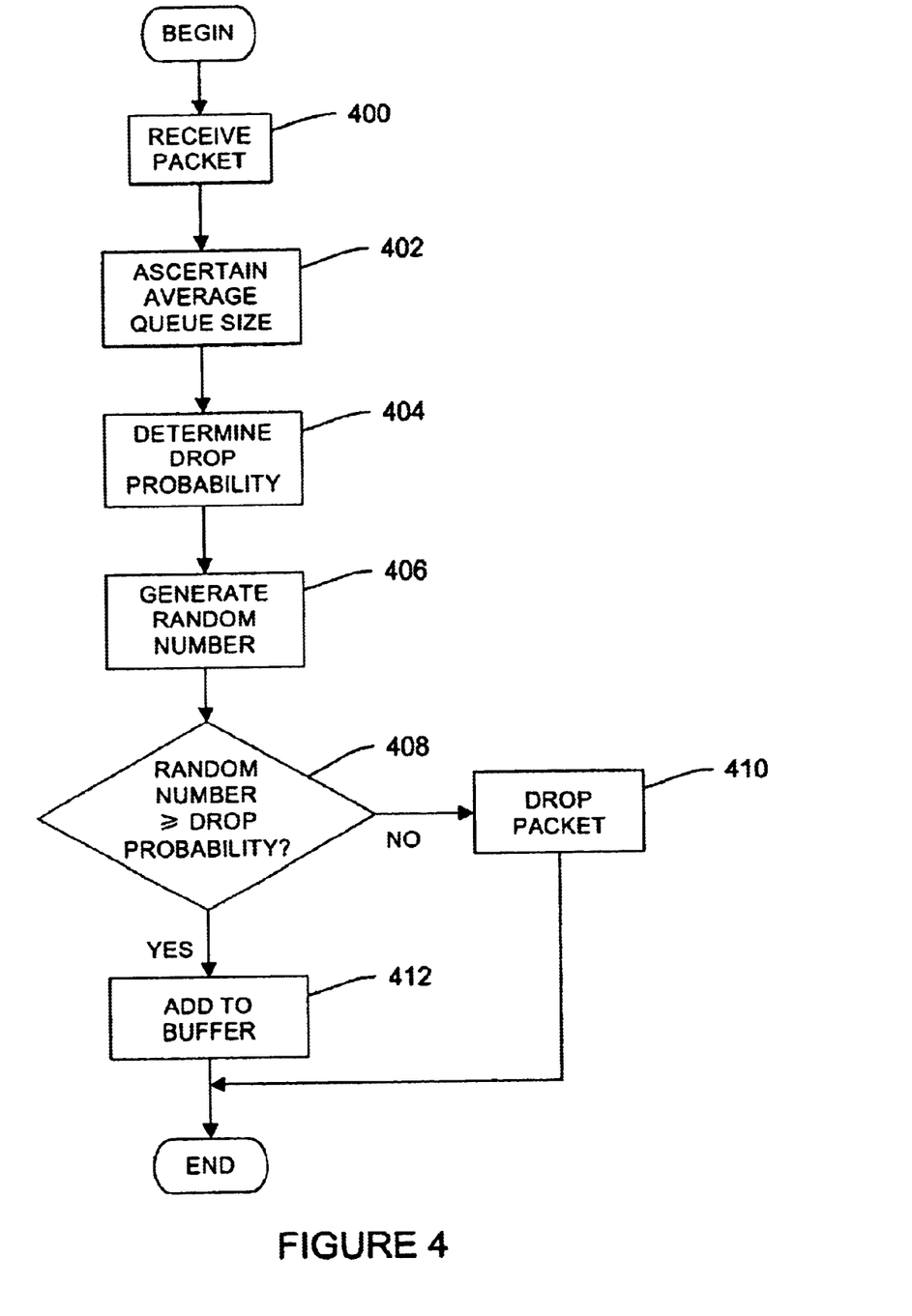
FIG. 4 shows an illustrative process of determining whether a received data packet is to be dropped or stored in the buffers shown in FIG. 2.

FIG. 4 shows an exemplary process for determining whether a data packet received by a network device 12 is to be dropped or added to one of the two buffers 22 and 24 shown in FIG. 2. This process, which may be implemented by the management module 20, preferably is executed for each data packet received by a given network device. Of course, this process illustratively is assumed to be executed when there is congestion that requires use of one or both of the two buffers 22 and 24. If there is no congestion, then data is transmitted at a relatively rapid rate that is limited by the maximum line speed only.

The process shown in FIG. 4 begins at step 400, in which a packet is received at the input of the given network device 12. After receipt, the packet is forwarded to the classifier 26 to determine the type of the data packet. Once the type of the data packet is determined, then the average queue size for the buffer 22 or 24 of the determined type is ascertained (step 402). For example, if the packet is determined to be a loss sensitive data packet, then the average queue size of the loss sensitive buffer 22 is determined. The average drop probability of the received packet then is determined from the drop function of the appropriate buffer 22 or 24 that may receive the packet (step 404). To that end, a mere inspection of the drop function curve of the appropriate buffer 22 or 24 may be utilized to determine the drop probability. Continuing with the loss sensitive packet example, the average drop probability of the received packet is determined from the drop function of the loss sensitive buffer 22. Such drop probability then is retained in memory for subsequent use in a later step of the process. The random number generator 38 (FIG. 2) then generates a random number between zero and one (step 406). In preferred embodiments, the random number generator 38 is configured to uniformly generate numbers between zero and one.

After the random number is generated, then it is determined at step 408 if the random number is greater than or equal to the drop probability determined at step 404. If not greater than or equal to the drop probability, then the received packet merely is dropped and thus, not permitted to be transmitted (step 410). Conversely, if the random number is greater than or equal to the drop probability, then the process continues to step 412, in which the received data packet is stored in the appropriate buffer 22 or 24 (i.e., the exemplary packet is stored in the loss sensitive buffer 22), thus permitting the packet ultimately to be transmitted to the network 10, and ending the process.

Once received data packets are in their respective buffers 22 and 24, then they are transmitted in a fair manner via the output module 28. As known by those in the art, packets are withdrawn and transmitted from their respective buffers 22 and 24 at a rate that does not exceed the speed of the output line. Attempting to transmit at a faster rate generally can cause packets to be dropped/lost. In preferred embodiments, the rates that packets are withdrawn from their respective buffers 22 and 24 differ. For example, packets in the delay sensitive buffer 24 may be withdrawn at a faster rate than those in the loss sensitive buffer 22.

In illustrative embodiments, the rates that packets are withdrawn from the buffers 22 and 24 vary according to assigned weighting factors. These weight factors are referred to herein as W1 for the loss sensitive buffer 22, and W2 for the delay sensitive buffer 24. In preferred embodiments, W1 and W2 are set in accordance with Equation 1 below:

Equation 1

$$\text{Output data rate} = W1*(\text{output line speed}) + W2*(\text{output line speed})$$

where W1+W2=1.0

Accordingly, W1*(output line speed) is the rate of withdrawal from the loss sensitive buffer 22, while W2*(output line speed) is the rate of withdrawal from the delay sensitive buffer 24. Note that since the output data rate cannot exceed the output line speed, then the sum of W1 and W2 cannot exceed a value of one. It therefore follows that since the output line speed is constant, then a change in the output data rate from either buffer 22 or 24 should require a change in output rate from the other buffer 22 or 24. Specifically, if the output rate of one buffer 22 or 24 is increased, the output rate of the other buffer 22 or 24 must be decreased since the output data rate is the maximum rate (i.e., the maximum output line rate). In such case, W2 must be decreased when W1 is increased. In a similar manner, W1 must be decreased if W2 is increased. Various embodiments vary the weighting factors to fairly withdraw data packets from the two buffers 22 and 24. One such embodiment is shown by the process of FIG. 5.

Figure 5:
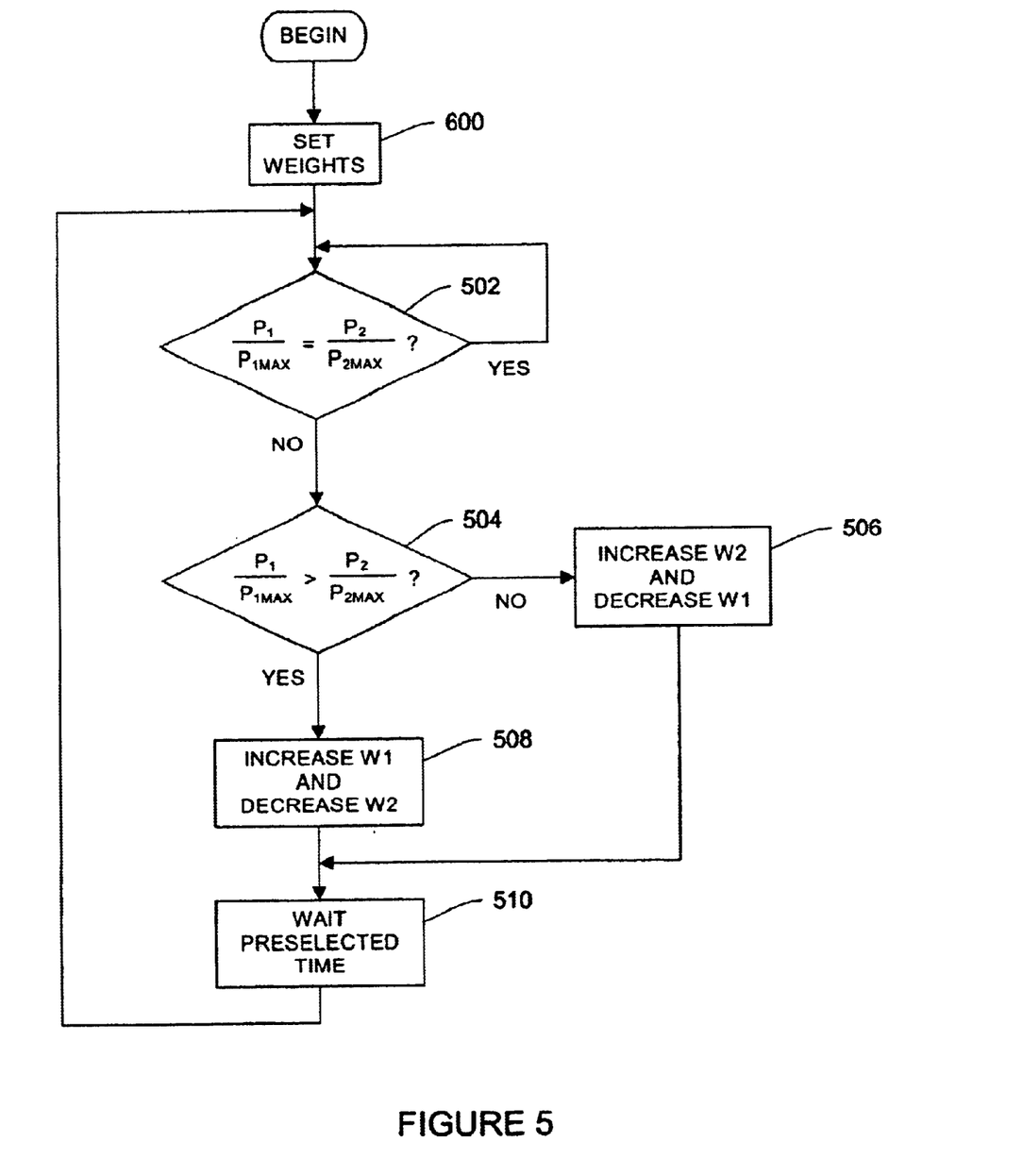
FIG. 5 shows a first illustrative process of transmitting data packets in a network device.

The process of FIG. 5 begins at step 500, in which the weight factors W1 and W2 are set to initial values. The initial values may be set to be any values. In some embodiments, they are preset to be values that represent the historical percentages of TCP traffic and other traffic across the Internet. For example, if the historical percentage of TCP traffic across the Internet is about 80%, then the initial values of the weighting factors W1 and W2 may be set to reflect this fact. In such case, W1 (i.e., the weighting factor of the loss sensitive buffer 22) may be set to be 0.8, while W2 (i.e., the weighting factor of the delay sensitive buffer 24) may be set to 0.2. In other embodiments, data packet traffic may be monitored and analyzed by the network device 12 executing the described processes to determine the type of traffic being received and/or transmitted. The initial values of the weighting factors W1 and W2 then may be set to values reflecting such actual traffic. For example, if the traffic is shown to have 59% TCP traffic, then W1 may be set to a value of 0.59 and W2 may be set to a value of 0.41.

After the initial weight factors are set, the process continues to step 502, in which drop rate ratios of the two buffers 22 and 24 are compared. In particular, it is determined at step 502 if:

$$P1/P1\text{max}=P2/P2\text{max}$$

where:

P1 is the average drop rate of the loss sensitive buffer 22;

P1max is the maximum drop rate of the loss sensitive buffer 22 at the maximum queue size;

P2 is the average drop rate of the delay sensitive buffer 24; and

P2max is the maximum drop rate of the delay sensitive buffer 24 at the maximum queue size.

If P1/P1max=P2/P2max, then the operating points are considered to be fairly distributed (in this embodiment). Accordingly, the operating points are not adjusted. Of course, in other embodiments, operating points may be considered fairly distributed based upon any equation and/or policy. Such policy may be set by anybody, such as a network node manager, or some standards board (e.g., the Internet Engineering Task Force).

Conversely, if P1/P1max is not equal to P2/P2max, then the process continues to step 504, in which it is determined if:

$$P1/P1\text{max}>P2/P2\text{max}$$

Based upon the result of this inequality, the values of W1 and W2 are modified in a manner that moves the respective operating points into a more fair relationship. Modification of W1 and W2 consequently causes data packets to be withdrawn from the buffers 22 and 24 at different rates than they were withdrawn before W1 and W2 were modified. This in turn should cause the average queue sizes to change, which consequently should change the operating points of each queue.

Accordingly, if P1/P1max is determined not to be greater than P2/P2max, then the process continues to step 506, in which W2 is increased and W1 is decreased. This modification causes packets to be withdrawn from the delay sensitive buffer 24 at a faster rate than before the modification. Consequently, as noted above, the average queue size in the delay sensitive buffer should decrease. In addition to increasing the withdrawal rate of the delay sensitive buffer 24, this modification causes packets to be withdrawn from the loss sensitive buffer 22 at a lower rate than before the modification. This modification thus should increase the average queue size in the loss sensitive buffer 22.

In some cases, however, queue size may continue to increase even after one of the weighting factors have been decreased. This can occur due to a variety of factors, such as the increased inflow of data packets into the network device 12. In a similar manner, queue size may continue to decrease even after one of the weighting factors have been increased. This can occur due to decreased inflow of data packets in the network device 12.

Returning to step 504, if P1/P1max is determined to be greater than P2/P2max, then the process continues to step 508, in which W1 is increased and W2 is decreased. This modification causes packets to be withdrawn from the loss sensitive buffer 22 at a faster rate than before the modification. Consequently, as noted above, the average queue size in the loss sensitive buffer should decrease. In addition to increasing the withdrawal rate of the loss sensitive buffer 22, this modification causes packets to be withdrawn from the delay sensitive buffer 24 at a lower rate than before the modification. This modification thus should increase the average queue size in the delay sensitive buffer 24.

In preferred embodiments, the weighting factors are changed at steps 506 and 508 by some small amount that minimizes the possibility of systemic oscillations. For example, the weighting factors may be changed by an amount of between about 0.5% to 1.5%.

Once the weighting factors are modified, then the process then continues to step 510, in which the process waits for a preselected time. Such time may be any preset time, such as ten seconds. After the preselected time has elapsed, the process loops back to step 502. This process thus repeats until no packets are received by the network device 12 and/or stored in the buffers 22 and 24.

Other methods for fairly transmitting the two different types of data packets may be utilized. For example, one such alternative method specifies that delay sensitive packets are to be either transmitted or dropped immediately upon receipt, while loss sensitive packets are to be buffered or dropped in the same manner as discussed with regard to FIG. 4. Once buffered, the loss sensitive packets are transmitted whenever a delay sensitive packet is not available for transmission. To ensure fair data transmission, however, the delay sensitive packets are dropped immediately as a function of the total number of loss sensitive packets buffered in the loss sensitive buffer 22.

Figure 6:
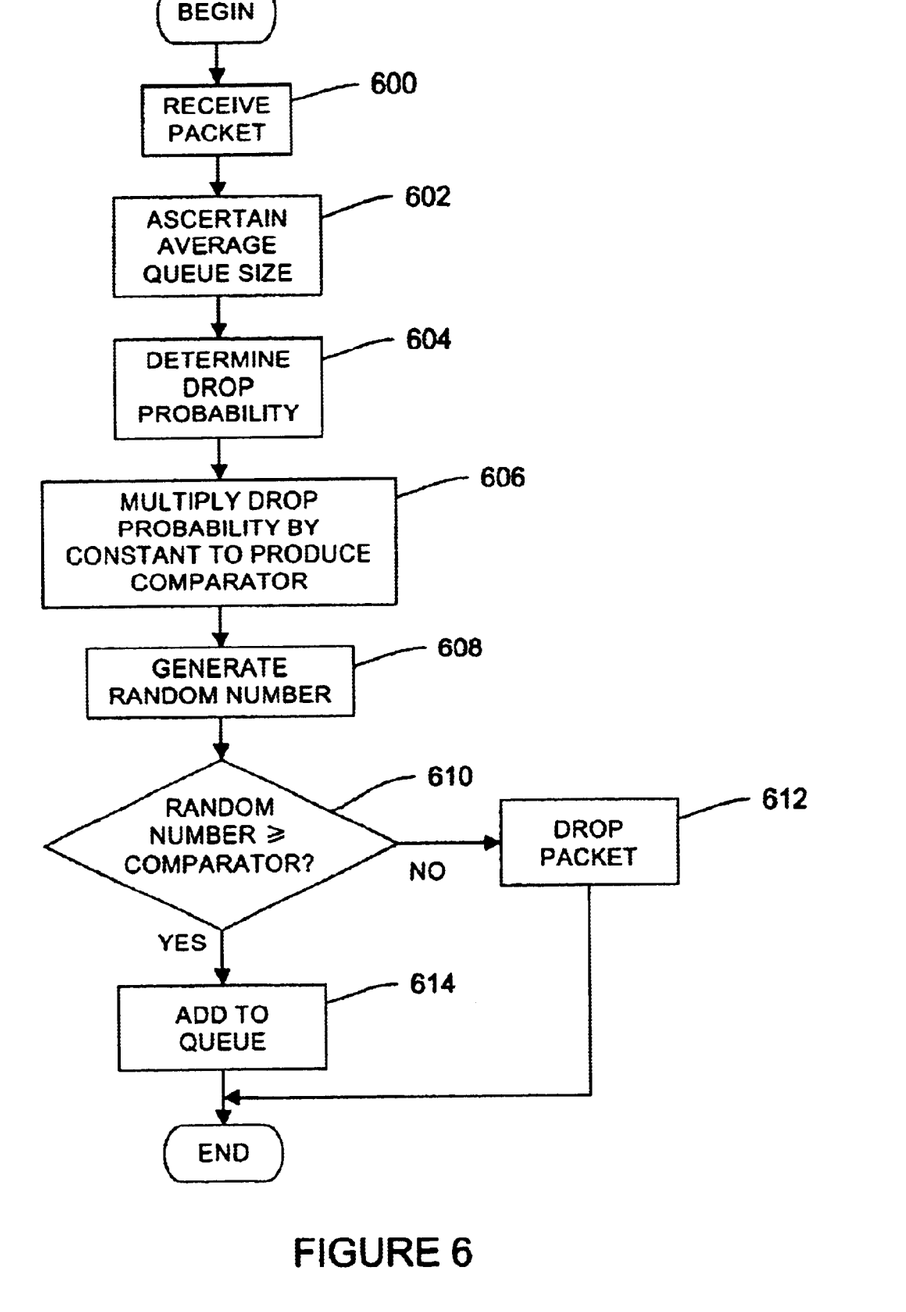
FIG. 6 shows a second illustrative process of determining whether a received data packet is to be dropped or stored in the delay sensitive buffer shown in FIG. 2.

FIG. 6 shows such an alternative method of determining whether delay sensitive packets received by a network device 12 are to be dropped, or added to the delay sensitive buffer 24. In a manner similar to the processes shown in FIGS. 4 and 5, this process is implemented by the management module 20. Unlike those processes, however, the process shown in FIG. 6 is executed for delay sensitive packets only. Loss sensitive packets, however, still are dropped or buffered in accordance with the process shown in FIG. 4. Accordingly, the loss sensitive buffer 22 implements the RED function shown in FIG. 3A, while the delay sensitive buffer 24 does not implement a RED function. Details are discussed below.

The process shown in FIG. 6 begins at step 600, in which a delay sensitive packet is received. Once the packet is received, then the average queue size of the loss sensitive buffer 22 is determined (step 602). The average drop probability of a loss sensitive packet in the loss sensitive buffer 22 then is determined from the drop function of the loss sensitive buffer 22 (step 604). To that end, a mere inspection of the drop function curve may be utilized to determine the drop probability. Once the average drop probability of a loss sensitive packet is determined, then the process continues to step 606, in which such drop probability is multiplied by a constant number to produce a comparitor (discussed below). The constant number may be any preselected number that is preprogrammed into the queue manager, or a constant number that is generated by the queue manager based upon traffic. For example, the constant number may range from five to seven, or three to nine.

The random number generator 38 then generates a random number between zero and one (step 608). In a manner similar to its execution in the process shown in FIG. 4, the random number generator 38 is configured to uniformly generate numbers between zero and one. After the random number is generated, then it is determined at step 610 if the random number is greater than or equal to the comparitor that was produced at step 606. If not greater than or equal to the comparitor, then the received packet merely is dropped and thus, not permitted to be transmitted (step 612). Conversely, if the random number is greater than or equal to the drop probability, then the process continues to step 614, in which the received data packet is either stored in the delay sensitive buffer 24, or transmitted to the network 10, thus ending the process.

As noted above, in this embodiment, delay sensitive packets are transmitted immediately upon receipt. Accordingly, unless a loss sensitive data packet is in the process of being transmitted when step 614 completes executing, then the delay sensitive packet being processed is immediately transmitted. Conversely, if a loss sensitive data packet is in the process of being transmitted, then the delay sensitive packet is buffered in the delay sensitive buffer 24 until such loss sensitive data packet is transmitted. Once such loss sensitive data packet is transmitted, then the delay sensitive packet is withdrawn from the delay sensitive buffer 24 for immediate transmission.

It should be noted that packets transmitting two different types of data (i.e., delay sensitive and loss sensitive data) are discussed as exemplary only. Accordingly, principles of illustrative embodiments may be applied to packets transmitting one of two or more different types of data.

As suggested above, preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as preprogrammed hardware elements (e.g., application specific integrated circuits or digital signal processors), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method of managing received packets to be tramsmitted from a network device, each packet being at least one of a first type and a second type, the method comprising:

storing the first type of packets in a first buffer, the first buffer having a first drop function that specifies a first packet drop rate as a function of the average number of first type of packets in the first buffer, the first drop function having a first average drop rate over a time interval;

storing the second type of packets in a second buffer, the second buffer having a second drop function that specifies a second packet drop rate as a function of the average number of second type of packets in the second buffer, the second drop function having a second average drop rate over the time interval; and modifying at least one of the first average drop rate and the second average drop rate if such two drop average rates do not comply with a predefined fairness relationship.

2. The method as defined by claim 1 wherein the first buffer has a first packet withdrawal rate that specifies the rate that packets are withdrawn from the first buffer, the second buffer having a second packet withdrawal rate that specifies the rate that packets are withdraw from the second buffer;

the act of modifying including:

changing at least one of the first packet withdrawal rate and the second packet withdrawal rate.

3. The method as defined by claim 1 wherein the act of modifying includes:

modifying the second average drop rate as a function of the average number of packets in the first buffer.

4. The method as defined by claim 1 wherein the first drop function has a first start point and a first end point, the second drop function also having a second start point and a second end point.

5. The method as defined by claim 4 wherein the predefined relationship specifies that the first average drop rate is at the first start point whenever the second average drop rate is at the second start point.

6. The method as defined by claim 4 wherein the predefined relationship specifies that the first average drop rate is at the first end point whenever the second average drop rate is at the second end point.

7. The method as defined by claim 4 wherein the first drop function defines a first curve connecting the first start point and the first end point, the second drop function defining a second curve connecting the second start point and the second end point, the predefined relationship specifying that the first average drop rate moves along the first curve at a first rate, the predefined relationship specifying that the second average drop rate moves along the second curve at a second rate, the first and second rates being rates.

8. The method as defined by claim 7 wherein the first rate and second rate are different.

9. The method as defined by claim 1 wherein the first type of packets are loss sensitive packets.

10. The method as defined by claim 9 wherein the second type of packets are delay sensitive packets.

11. The method as defined by claim 1 wherein the act of modifying includes:
    altering at least one of the first drop function and the second drop function.

12. The method as defined by claim 1 wherein the first and second drop functions represent a drop probability.

13. A packet manager for managing received packets to be transmitted from a network device, the packets being at least one of a first type and a second type, the packet manager comprising:
    a first buffer for storing the first type of packet, the first buffer having a first drop function that specifies a first packet drop rate as a function of the average number of first type of packets in the first buffer, the first drop function having a first average drop rate over a time interval;
    a second buffer for storing the second type of packets, the second buffer having a second drop function that specifies a second packet drop rate as a function of the average number of second type of packets in the second buffer, the second drop function having a second average drop rate over the time interval; and
    a modifier module operatively coupled with the first buffer and the second buffer, the modifier module modifying at least one of the first average drop rate and the second average drop rate if such two average drop rates do not comply with a predefined fairness relationship.

14. The packet manager as defined by claim 13 wherein the first buffer has a first packet withdrawal rate that specifies the rate that packets are withdrawn from the first buffer,
    the second buffer having a second packet withdrawal rate that specifies the rate that packets are withdrawn from the second buffer;
    the modifier module including:
    a withdrawal module that changes at least one of the first packet withdrawal rate and the second packet withdrawal rate.

15. The packet manager as defined by claim 13 wherein the modifier module includes:
    a rate modifier that modifies the second average drop rate as a function of the average number of packets in the first buffer.

16. The packet manager as defined by claim 13 wherein the first drop function has a first start point and a first end point,
    the second drop function also having a second start point and a second end point.

17. The packet manager as defined by claim 16 wherein the predefined relationship specifies that the first average drop rate is at the first start point whenever the second average drop rate is at the second start point.

18. The packet manager as defined by claim 16 wherein the predefined relationship specifies that the first average drop rate is at the first end point whenever the second average drop rate is at the second end point.

19. The packet manager as defined by claim 16 wherein the first drop function defines a first curve connecting the first start point and the first end point, the second drop function defining a second curve connecting the second start point and the second end point,
    the predefined relationship specifying that the first average drop rate moves along the first curve at a first rate, the predefined relationship specifying that the second average drop rate moves along the second curve at a second rate, the first and second rates being constant rates.

20. The packet manager as defined by claim 19 wherein the first rate and second rate are different.

21. The packet manager as defined by claim 13 wherein the first type of packets are loss sensitive packets.

22. The packet manager as defined by claim 13 wherein the second type of packets are delay sensitive packets.

23. The packet manager as defined by claim 13 wherein the modifier module alters at least one of the first drop function and the second drop function.

24. The method as defined by claim 13 wherein the first and second drop functions represent a drop probability.

25. A computer program product for use on a computer system for managing received packets to be transmitted from a network device, the packets being at least one of a first type and a second type, the computer program product comprising a computer usable medium having computer readable program code thereon, the computer readable program code comprising:
    program code for storing the first type of packets in a first buffer, the first buffer having a first drop function that specifies a first packet drop rate as a function of the average number of first type of packets in the first buffer, the first drop function having a first average drop rate over a time interval;
    program code for storing the second type of packets in a second buffer, the second buffer having a second drop function that specifies a second packet drop rate as a function of the average number of second type of packets in the second buffer, the second drop function having a second average drop rate over the specified time interval; and
    program code for modifying at least one of the first average drop rate and the second average drop rate if such two average drop rates do not comply with a predefined fairness relationship.

26. The computer program product as defined by claim 25 wherein the first buffer has a first packet withdrawal rate that specifies the rate that packets are withdrawn from the first buffer,
    the second buffer having a second packet withdrawal rate that specifies the rate that packets are withdrawn from the second buffer;
    the program code for modifying including:
    program code for changing at least one of the first packet withdrawal rate and the second packet withdrawal rate.

27. The computer program product as defined by claim 25 wherein the program code for modifying includes:
    program code for modifying the second average drop rate as a function of the average number of packets in the first buffer.

28. The computer program product as defined by claim 25 wherein the first drop function has a first start point and a first end point,
    the second drop function also having a second start point and a second end point.

29. The computer program product as defined by claim 28 wherein the predefined relationship specifies that the first average drop rate is at the first start point whenever the second average drop rate is at the second start point.

30. The computer program product as defined by claim 28 wherein the predefined relationship specifies that the first average drop rate is at the first end point whenever the second average drop rate is at the second end point.

31. The computer program product as defined by claim 28 wherein the first drop function defines a first curve connecting the first start point and the first end point, the second drop function defining a second curve connecting the second start point and the second end point, the predefined relationship specifying that the first average drop rate moves along the first curve at a first rate, the predefined relationship specifying that the second average drop rate moves along the second curve at a second rate, the first and second rates being constant rates.

32. The computer program product as defined by claim 31 wherein the first rate and second rate are different.

33. The computer program product as defined by claim 25 wherein the first type of packets are loss sensitive packets.

34. The computer program product as defined by claim 33 wherein the second type of packets are delay sensitive packets.

35. The computer program product as defined by claim 25 wherein the program code for modifying includes:

program code for altering at least one of the first drop function and the second drop function.

36. The computer program product as defined by claim 25 wherein the first and second drop functions represent a drop probability.

37. A method of processing a received packet for transmission across a network, the packet being one of at least two types of packets, the at least two types of packets including delay sensitive packets and loss sensitive packets, the method comprising:

determining the type of the packet;

adding the packet to a loss sensitive buffer if the packet is determined to be a loss sensitive packet, the loss sensitive buffer having a loss sensitive packet drop function relating to dropping packets in the loss sensitive buffer;

adding the packet to a delay sensitive buffer if the packet is determined to be a delay sensitive packet, the delay sensitive buffer having a delay sensitive packet drop function relating to dropping packets in the delay sensitive buffer;

the two buffers being operatively coupled with an output for forwarding packets to the network, the loss sensitive packet drop function and the delay sensitive packet drop function being different and related to achieve a predetermined fairness.

38. The method as defined by claim 37 wherein each packet drop functions produces a packet drop rate as a function of the average number of packets in its buffer.

39. The method as defined by claim 37 further comprising:

forwarding the packet from one of the two buffers to the output for transmission to the network.

40. The method as defined by claim 37 wherein the packet has a header with data identifying the type, the type being determined by parsing the header.

41. The method as defined by claim 37 wherein the two buffers each have an associated weight variable for transmitting packets to the network.

42. The method as defined by claim 41 wherein the weight variable of each buffer has an associated fairness quality.

43. An apparatus for processing a received packet for transmission across a network, the packet being one of at least two types of packets, the at least two types of packets including delay sensitive packets and loss sensitive packets, the method comprising:

a packet module for determining the type of the packet;

a loss sensitive buffer operatively coupled with the packet module, the loss sensitive buffer storing the packet if the packet is determined to be a loss sensitive packet, the loss sensitive buffer having a loss sensitive packet drop function relating to dropping packets in the loss sensitive buffer;

a delay sensitive buffer operatively coupled with the packet module, the delay sensitive buffer storing the packet if the packet is determined to be a delay sensitive packet, the delay sensitive buffer having a delay sensitive packet drop function relating to dropping packets in the delay sensitive buffer, said delay sensitive packet drop function being related to said loss sensitive packet drop function to achieve a predetermined fairness, the loss sensitive packet drop function and the delay sensitive packet drop function being different; and an output module operatively coupled with the two buffers, the output module forwarding packets to the network.

44. The apparatus as defined by claim 43 wherein each packet drop functions produces a packet drop rate as a function of the average number of packets in its buffer.

45. The apparatus as defined by claim 43 further comprising:

forwarding the packet from one of the two buffers to the output for transmission to the network.

46. The apparatus as defined by claim 43 wherein the packet has a header with data identifying the type, the type being determined by parsing the header.

47. The apparatus as defined by claim 43 wherein the two buffers each have an associated weight variable for transmitting packets to the network.

48. The apparatus as defined by claim 47 wherein the weight variable of each buffers has an associated fairness quality.

49. A computer program product for use on a computer system for processing a received packet for transmission across a network, the packet being one of at least two types of packets, the at least two types of packets including delay sensitive packets and loss sensitive packets, the computer program product comprising a computer usable medium having computer readable program code thereon, the computer readable program code comprising:

program code for determining the type of the packet;

program code for adding the packet to a loss sensitive buffer if the packet is determined to be a loss sensitive packet, the loss sensitive buffer having a loss sensitive packet drop function relating to dropping packets in the loss sensitive buffer; and program code for adding the packet to a delay sensitive buffer if the packet is determined to be a delay sensitive packet, the delay sensitive buffer having a delay sensitive packet drop function relating to dropping packets in the delay sensitive buffer;

the two buffers being operatively coupled with an output for forwarding packets to the network, the loss sensitive packet drop function and the delay sensitive packet drop function being different and related to achieve a predetermined fairness.

50. The computer program product as defined by claim 49 wherein each packet drop functions produces a packet drop rate as a function of the average number of packets in its buffer.

51. The computer program product as defined by claim 49 further comprising:

program code for forwarding the packet from one of the two buffers to the output for transmission to the network.

52. The computer program product as defined by claim 49 wherein the packet has a header with data identifying the type, the program code for determined including program code for parsing the header.

53. The computer program product as defined by claim 49 wherein the two buffers each have an associated weight variable for transmitting packets to the network.

54. The computer program product as defined by claim 53 wherein the weight variable of each buffer has an associated fairness quality.

55. The computer program product as defined by claim 49 wherein the loss sensitive packet drop function relates to drop probabilities.

56. A system for managing packets to be transmitted from a network device, the packets being one of a first type and a second type, the system comprising:

a packet marker for marking the type of each packet;

an input module for receiving packets;

a first buffer operatively coupled with the input module, the first buffer storing the first type of packets, the first buffer having a first drop function that specifies a packet drop rate as a function of the average number of packets in the first buffer, the first drop function having a first average drop rate over a specified time interval;

a second buffer operatively coupled with the input module, the second buffer storing the second type of packets, the second buffer having a second drop function that specifies a packet drop rate as a function of the average number of packets in the second buffer, the second drop function having a second average drop rate over the specified time interval, the first average drop rate and the second average drop rat having a predefined relationship; and a modifier module operatively coupled with the first buffer and the second buffer, the modifier module modifying at least one of the first average drop rate and the second average drop rate if such two drop rates do not comply with the predefined fairness relationship.

57. The system as defined by claim 56 wherein the first buffer has a first packet withdrawal rate that specifies the rate that packets are withdrawn from the first buffer, the second buffer having a second packet withdrawal rate that specifies the rate that packets are withdrawn from the second buffer, the modifier module including:

a withdrawal module that changes at least one of the first packet withdrawal rate and the second packet withdrawal rate.

58. The system as defined by claim 56 wherein the modifier module includes:

a rate modifier that modifies the second average drop rate as a function of the average of packets in the first buffer.

\* \* \* \* \*